(12) United States Patent
Lampe et al.

(10) Patent No.: US 8,994,506 B2
(45) Date of Patent: Mar. 31, 2015

(54) APPARATUS AND METHOD FOR PROCESSING RFID SIGNALS

(71) Applicant: The University of British Columbia, Vancovuer (CA)

(72) Inventors: Lutz Lampe, Vancouver (CA); Dana Hoffmann, Vancouver (CA)

(73) Assignee: The University of British Columbia, Vancouver, B.C. (CA)

( * ) Notice: Subject to any disclaimer, the term of this patent is extended or adjusted under 35 U.S.C. 154(b) by 172 days.

(21) Appl. No.: 13/791,725

(22) Filed: Mar. 8, 2013

(65) Prior Publication Data
US 2013/0234834 A1 Sep. 12, 2013

Related U.S. Application Data

(60) Provisional application No. 61/608,368, filed on Mar. 8, 2012.

(51) Int. Cl.
*H04Q 5/22* (2006.01)
*G06K 19/07* (2006.01)
*G06K 7/10* (2006.01)
*H04B 5/00* (2006.01)

(52) U.S. Cl.
CPC ........ *G06K 19/0723* (2013.01); *G06K 7/10069* (2013.01); *H04B 5/0062* (2013.01)
USPC ...................................................... 340/10.2

(58) Field of Classification Search
CPC .............. H04L 25/0202; H04L 25/024; H04L 25/0204; H04L 25/0256; H04L 25/0258; H04L 27/0295
USPC .......................... 340/10.2, 10.1, 10.4, 13.26, 340/572.1–572.9; 370/527, 227; 375/316
See application file for complete search history.

(56) References Cited

U.S. PATENT DOCUMENTS

| | | | |
|---|---|---|---|
| 5,986,570 A | 11/1999 | Black et al. | |
| 7,009,495 B2 | 3/2006 | Hughes et al. | |
| 7,561,048 B2 * | 7/2009 | Yushkov et al. | 340/572.1 |
| 8,170,068 B2 * | 5/2012 | Bhushan et al. | 370/527 |
| 2003/0198305 A1 * | 10/2003 | Taylor et al. | 375/341 |
| 2010/0039233 A1 * | 2/2010 | Niedzwiecki et al. | 340/10.1 |
| 2010/0156610 A1 * | 6/2010 | Wild et al. | 340/10.34 |

OTHER PUBLICATIONS

Guard RFID, "Guard RFID 433 MHz PHY Proposal," document IEEE 802.15-09-0619-00-004f, Sep. 2009.
J.G. Proakis, Digital Communications, 4th ed., New York: McGraw-Hill, pp. 192-195, 2001.

(Continued)

*Primary Examiner* — Phung Nguyen
(74) *Attorney, Agent, or Firm* — Borden Ladner Gervais LLP; Todd Keeler

(57) ABSTRACT

A method of processing RFID data packets at an RFID receiver includes performing channel estimation and data detection on a first received RFID data packet in a single-user reception mode, the first RFID data packet being transmitted by a first RFID tag and in response to detection of a second received RFID data packet from a second RFID tag while the first RFID data packet is being processed in the single-user reception mode, performing channel estimation and data detection in a multi-user reception mode to recover data transmitted from both the first and second RFID tags in a collision-less manner.

18 Claims, 9 Drawing Sheets

(56) References Cited

OTHER PUBLICATIONS

S. Haykin, Adaptive Filter Theory, Prentice Hall, pp. 421-426 and pp. 610-612, 2002.

S. Ahmed, S. Lambotharan, A. Jakobsson, J.A. Chambers, "Parameter estimation and equalization techniques for communication channels with multipath and multiple frequency offsets," IEEE Transactions on Communications, vol. 53, No. 2, pp. 219-223, Feb. 2005.

P. Krishna and D. Husalc, "RFID Infrastructure," IEEE Communications Magazine, vol. 45, No. 9, pp. 4-10, Sep. 2007.

L. Biao, H. Ai-qun and Q. Zhong-yuan, "Trends and Brief Comments on Anti-collision Techniques in Radio Frequency Identification System," 6th International Conference on ITS Telecommunications Proceedings, pp. 241-245, Jun. 2006.

P.A. Murphy, M. and Golanbari, G.E. Ford, and M.J. Ready, "Optimum and Reduced Complexity Multiuser Detectors for Asynchronous CPM Signaling," IEEE Transactions on Wireless Communications, vol. 5, No. 8, pp. 1959-1965, Aug. 2006.

B. Picinbono and P. Chevalier, "Widely linear estimation with complex data," IEEE Transactions on Signal Processing, vol. 43, No. 8, pp. 2030-2033, Aug. 1995.

P. Chevalier and F. Pipon, "New insights into optimal widely linear array receivers for the demodulation of BPSK, MSK, and GMSK signals corrupted by noncircular interferences-application to SAIC," IEEE Transactions on Signal Processing, vol. 54, No. 3, pp. 870-883, Mar. 2006.

R. Meyer, W.H. Gerstacker, R. Schober, and J.B. Huber, "A single antenna interference cancellation algorithm for increased GSM capacity," IEEE Transactions on Wireless Communications, vol. 7, No. 5, pp. 1616-1621, Jul. 2006.

Y. Zhang, G. Bhanage, W. Trappe, Y. Zhang and R. Howard, "Facilitating an Active Transmit-only RFID System Through Receiver-based Processing," 4th Annual IEEE Communications Society Conference on Sensor, Mesh and Ad Hoc Communications and Networks, pp. 421-430, Jun. 2007.

D. Shen, G. Woo, D.P. Reed, and A.B. Lippman, and J. Wang, "Separation of multiple passive RFID signals using software defined radio," IEEE International Conference on RFID, pp. 139-146, Apr. 2009.

R.S. Khasgiwale, R.U. Adyanthaya, and D.W. Engels, "Extracting information from tag collisions," IEEE International Conference on RFID, pp. 131-138, Apr. 2009.

C. Angerer, G. Maier, B. Delgado, M. Rupp, J.V. Alonso, "Single antenna physical layer collision recovery receivers for RFID readers," IEEE International Conference on Industrial Technology (ICIT), pp. 1406-1411, Mar. 2010.

C. Angerer, R. Langwieser, M. Rupp, "RFID reader receivers for physical layer collision recovery," IEEE Transactions on Communications, vol. 58, No. 12, pp. 3526-3537, Dec. 2010.

K. Fyhn, R.M. Jacobson, P. Popovski, A. Scaglione, and T. Larsen, "Multipacket Reception of Passive IHF RFID Tags: A Communication Theoretic Approach," IEEE Transactions on Signal Processing, vol. 59, No. 9, pp. 4225-4237, Sep. 2011.

A. Palomo-Lopez et al., "CSMA Multi-Stage Anti-collision Protocol for Active RFID, " 4th International Workshop on RFID Technology—Concepts, Applications, Challenges (IWRT), Madeira, Jun. 8-9, 2010.

IEEE Std 802.15.4f-2011, "Active Radio Frequency Identification (RFID) System Physical Layer (PHY)," Apr. 2012.

* cited by examiner

| Input Load | SIR [dB] | Collision Rate | Packet Error Rate for conventional detection | | | Packet Error Rate for WL MUD as disclosed | | |
|---|---|---|---|---|---|---|---|---|
| | | | Tag 1 | Tag 2 | Total | Tag 1 | Tag 2 | Total |
| 0.2 | 0 | 0.1871 | 0.1372 | 0.1871 | 0.1621 | 0.0004 | 0.0006 | 0.0005 |
| | 6 | | 0.0000 | 0.1871 | 0.0936 | 0.0000 | 0.0579 | 0.0290 |
| | -6 | | 0.1847 | 0.1871 | 0.1859 | 0.0945 | 0.0244 | 0.0595 |
| 0.5 | 0 | 0.3968 | 0.3081 | 0.3968 | 0.3525 | 0.0020 | 0.0022 | 0.0021 |
| | 6 | | 0.0000 | 0.3968 | 0.1984 | 0.0000 | 0.1290 | 0.0645 |
| | -6 | | 0.3917 | 0.3968 | 0.3942 | 0.1990 | 0.0595 | 0.1292 |
| 1 | 0 | 0.6372 | 0.5204 | 0.6372 | 0.5788 | 0.0037 | 0.0047 | 0.0042 |
| | 6 | | 0.0000 | 0.6372 | 0.3186 | 0.0000 | 0.2214 | 0.1107 |
| | -6 | | 0.6296 | 0.6372 | 0.6334 | 0.3195 | 0.0989 | 0.2092 |

FIG. 11

APPARATUS AND METHOD FOR PROCESSING RFID SIGNALS

CROSS-REFERENCE TO RELATED APPLICATIONS

The present application claims priority to U.S. Ser. No. 61/608,368, filed Mar. 8, 2012, which is herein incorporated by reference.

TECHNICAL FIELD

The present disclosure relates to wireless communication and to the detection of radio frequency identification (RFID) signals.

BACKGROUND

Radio Frequency Identification (RFID) is a wireless communication technology used for identifying, tracking and locating a physical object. RFID has applications in many different industries such as inventory control, tracking people and assets (e.g. mobile medical equipment, hospital patients and personnel), electronic toll collection, and access control. Generally, an RFID system is composed of multiple identifying tags that are attached to the objects, and readers that collect data from the tags. Often, RFID systems include a central processing unit that gathers and processes data from the readers. An RFID system may include thousands of tags in the range of a single reader at a given time, e.g. in a warehouse application.

RFID tags are generally classified as active or passive. Passive tags utilize energy received from a signal from the reader to transmit data, which limits the range over which passive RFID tags can be identified. Active tags utilize energy from a battery contained within the tag to generate and transmit the signal, providing better range and reliability. Active tags are typically more expensive than passive tags, and have a limited battery life. However, active tag RFID systems have an advantage in applications that require monitoring and data logging because the tags can remain operational even when they are out of the range of a reader.

Active tags may operate in duplex or simplex mode. Simplex mode tags, also referred to as transmit-only tags, benefit from low power consumption and simple tag design.

A major challenge in RFID systems is detection failure caused by signal collisions, which occur when a reader simultaneously receives signals from multiple tags.

Most of the work undertaken to address signal collisions has assumed that colliding signals cannot be detected and, therefore, has focused on anti-collision protocols in the Medium Access Control (MAC) layer, such as "Slotted Aloha" and "Binary Splitting". MAC-based anti-collision protocols rely on the tags retransmitting data signals when a collision is detected, causing delayed identification and possibly faster depletion of the limited power resources within the tag. Further, MAC-based anti-collision protocols are not feasible in simplex, or transmit-only, mode tags because MAC-based anti-collision protocols require, either, that the tags themselves detect the signal collisions, or that the tags receive an indication from the reader that a collision has occurred.

Resolving the colliding signals at the physical layer in an RFID system would be beneficial because retransmission of the tag signals would not be necessary. However, resolving colliding signals at the physical layer in RFID systems poses unique challenges. For example, receivers utilized in wireless systems, in particular cellular systems, for which collision resolution at the physical layer has been developed, assume that users are assigned channel resources and therefore transmit in a synchronized fashion. This synchronization simplifies packet acquisition and the identification of collisions compared to RFID systems, particularly in the case of transmit-only RFID. Furthermore, in cellular systems, users can be assumed to transmit with the same frequency with relatively high accuracy and stability, which is not the case in RFID systems in which RFID tags utilize inexpensive circuitry for signal generation.

A method for resolving multiple, overlapping signals at the physical layer for an RFID system is desirable, particularly for active transmit-only RFID tags.

SUMMARY

According to an aspect of the disclosure, there is provided a method of processing RFID data packets at an RFID receiver that includes performing channel estimation and data detection on a first received RFID data packet in a single-user reception mode, the first RFID data packet being transmitted by a first RFID tag, acquiring a second received RFID data packet from a second RFID tag while the first RFID data packet is being processed in the single-user reception mode, and in response to acquiring the second received RFID data packet, performing channel estimation and data detection in a multi-user reception mode to recover data transmitted from both the first and second RFID tags in a collision-less manner.

According to another aspect of the disclosure, the method further includes determining that a preamble of the second received RFID data packet overlaps in time a preamble of the first RFID data packet, and in response to the determining, improving the channel estimation of the first received RFID data packet determined in the single-user reception mode, prior to performing the channel estimation and the data detection in the multi-user reception mode.

According to another aspect of the disclosure, improving the channel estimation comprises applying a least-square estimation filter to the first and second received RFID data packets in response to determining that the preamble of the second received RFID data packet overlaps in time with the preamble of the first RFID data packet.

According to another aspect of the disclosure, the method includes, in the multi-user reception mode, performing a frequency offset estimation for the second received RFID data packet.

According to another aspect of the disclosure, acquiring the second received RFID data packet comprises using a residual received signal.

According to another aspect of the disclosure, performing data detection in the multi-user reception mode comprises utilizing widely linear detection in a mode of one of linear multi-user detection, decision-feedback multi-user detection, and maximum-likelihood multi-user detection.

According to another aspect of the disclosure, the first received data packet and the second received data packet are acquired by applying oversampling. According to another aspect of the disclosure, the first received data packet and the second received data packet are acquired by utilizing multiple RFID antennae.

According to another aspect of the disclosure, performing data detection in the multi-user reception mode comprises utilizing filters optimized according to criterion from one of zero-forcing and minimum mean-square error.

According to another aspect of the disclosure, performing data detection in the multi-user reception mode comprises utilizing filters that are adaptively optimized using a recursive algorithm.

According to another aspect of the disclosure, performing channel estimation in the multi-user reception mode comprises determining an estimate of the interfering data symbols of the first received data packet.

According to another aspect of the disclosure, there is disclosed an RFID receiver for processing RFID data packets that includes a data packet acquisition unit for receiving RFID data packets transmitted by RFID tags, a channel estimator, and a data detector, wherein the channel estimator and the data detector perform channel estimation and data detection on a first received RFID data packet in a single-user reception mode, the first RFID data packet being transmitted by a first RFID tag, and wherein the data packet acquisition unit is configured to acquire a second received RFID data packet while the first RFID data packet is being processed in the single-user reception mode, the second RFID data packet being transmitted by a second RFID tag, and, in response to acquiring a second received RFID data packet, the channel estimator and the data detector perform channel estimation and data detection in a multi-user reception mode to recover data transmitted from both the first and second RFID tags in a collision-less manner.

According to another aspect of the disclosure, the RFID receiver includes a preamble overlap detector that determines whether a preamble of the second received RFID data packet overlaps in time with a preamble of the first RFID data packet.

According to another aspect of the disclosure, in the multi-user reception mode, the channel estimator applies a least-square estimation filter to the first and second received RFID data packets in response to the preamble overlap detector determining that the preamble of the second received RFID data packet overlaps in time with the preamble of the first RFID data packet.

According to another aspect of the disclosure, in the multi-user reception mode, the data detector utilizes widely linear detection in a mode of one of linear multi-user detection, decision-feedback multi-user detection, and maximum-likelihood multi-user detection.

According to another aspect of the disclosure, in the multi-user reception mode, the data detector utilizes filters optimized according to criterion from one of zero-forcing and minimum mean-square error.

According to another aspect of the disclosure, in the multi-user reception mode, the data detector utilizes filters that are adaptively optimized using a recursive algorithm.

According to another aspect of the disclosure, the recursive algorithm is one of a least mean squares algorithm and a recursive least squares algorithm.

According to another aspect of the disclosure, in the multi-user reception mode, the channel estimator determines an estimate of the interfering data symbols of the first received data packet.

According to another aspect of the disclosure, in the multi-user reception mode, the data packet acquisition unit performs a frequency offset estimation for the second received RFID data packet.

According to another aspect of the disclosure, in the multi-user reception mode, acquiring the second received RFID data packet comprises using a residual received signal.

Other aspects of the present invention will be apparent from the following detailed description of the embodiments and the accompanying drawings.

DRAWINGS

Embodiments of the present invention will be described, by way of example, with reference to the drawings and to the following description, in which:

FIG. 11 shows a table of simulated packet error rates for an embodiment of the invention when two tags send their packets randomly and includes a comparison of the simulated packet error rates with the packet error rates for conventional detection.

DETAILED DESCRIPTION

Figure 1:
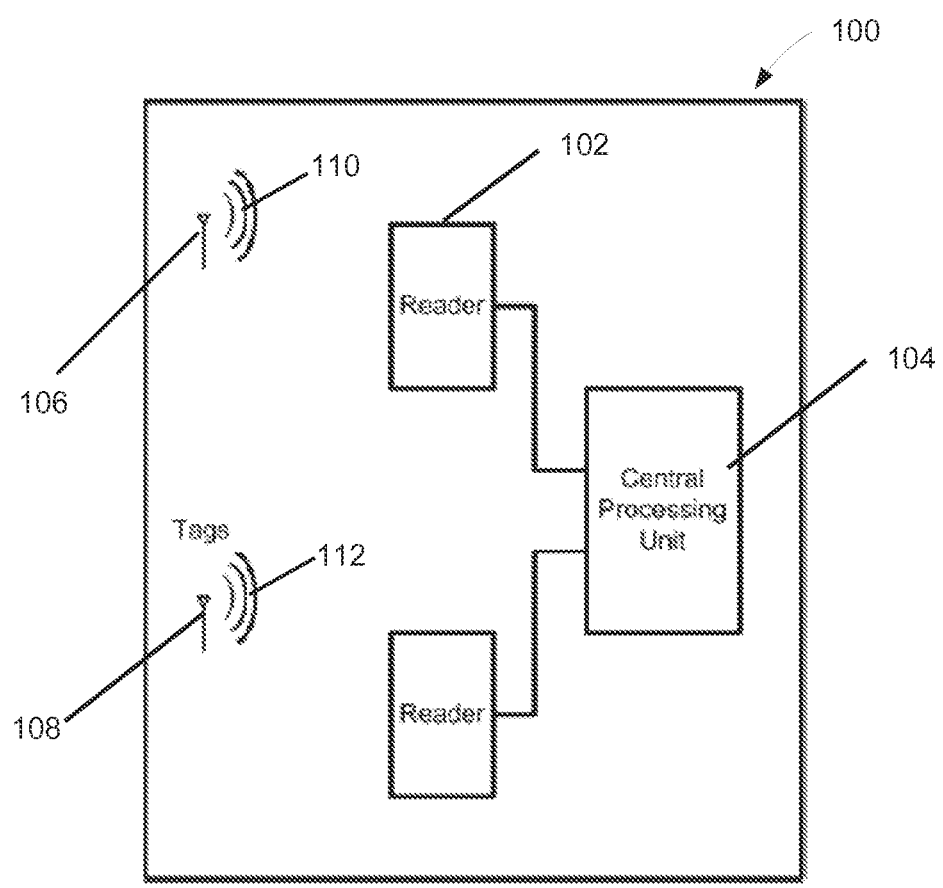
FIG. 1 shows a schematic view of an RFID system according to an embodiment of the invention in accordance with the present disclosure.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates a method and a receiver for performing multi-packet reception. The receiver detects signals sent by active radio frequency identification (RFID) tags using real-valued signal constellations, such as, for example, binary phase shift keying (BPSK) and minimum-shift keying (MSK). The receiver comprises packet acquisition, preamble overlap detection, channel estimation, and data detection.

The receiver operates in a conventional single-packet reception (also referred to as single-user reception) mode until the acquisition detects a simultaneously received data packet from a second tag. Then channel estimation and data detection switch into a multi-packet reception mode (also referred to as a multi-user reception mode) to recover the data transmitted from both tags. The RFID system may be modeled as an equivalent multiple-input single-output system with real-valued modulation. This model enables the application of so-called widely linear (WL) multi-user detection (MUD) methods, for which linear or nonlinear optimization criteria may be applied. The disclosed configuration allows for improved performance over the conventional RFID receivers in that simultaneous transmissions from two tags, which usually lead to packet collisions, can be resolved.

Referring to FIG. 1, a schematic view of an RFID system 100 is shown. The RFID system includes one or more RFID readers 102 in communication with a central processing unit (CPU) 104. A plurality of RFID tags 106, 108 transmit data packets 110, 112. The data packets 110, 112 are received and processed by the RFID readers 102. Typically, the RFID tags 106, 108 are each attached to or associated with an object. The data packets 110, 112 each include unique data such that when, for example, the data packet 110 from RFID tag 106 is received at the reader 102, it is, for example, utilized to identify the object associated with the RFID tag 106.

Figure 2A:
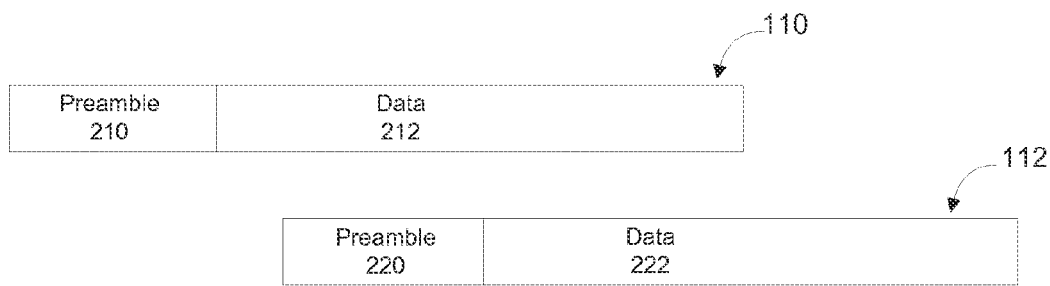
FIG. 2a and FIG. 2b show schematic views of overlapping RFID data packets in accordance with the disclosure.
Figure 2B:
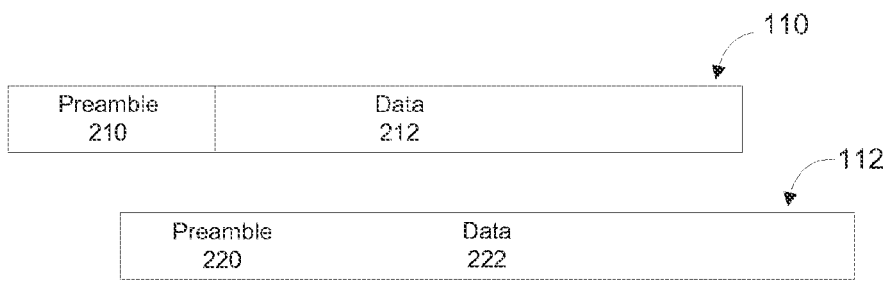

Referring to FIG. 2a and FIG. 2b, schematics of the data packets 110, 112 are shown. Data packet 110 includes a preamble 210 and a data portion 212, and data packet 112 includes a preamble 220 and a data portion 222.

Generally, the preambles 210, 220 of the data packets 110, 112 are known at the reader 102. The preambles 210, 220 facilitate packet acquisition, synchronization, and channel estimation at the reader 102, which are required for detection of the data portions 212, 222.

Generally, the data portions 212, 222 are unknown at the reader 102. Often the data portions 212, 222 include control information, also known as a header part, and the identification data, also known as a payload part.

In some cases, the data packet 110 from the tag 106 may be received by a reader 102 in close proximity in time to the data packet 112 from the tag 108 such that the data packet 110 at least partially overlaps in time with the data packet 112. Two data packets 110, 112 overlapping in time at the reader 102 may result in a collision. Collisions of data packets 110, 112 result in interference at the reader 102 that makes resolving the individual data packets 110, 112 difficult compared with a single, non-colliding data packet 110.

Generally, overlapping data packets 110, 112 occur in one of two types. FIG. 2a illustrates a first type of overlap in which the preamble 210 of the first received data packet 110 does not overlap in time with the preamble 220 of the second, later received data packet 112. In this type of overlap, the second data packet 112 does not interfere with the preamble 210 of the first data packet 110, but the second data packet 112 does interfere with a portion of the data 212 of the first data packet 110. Thus, the preamble 210 may be resolved by the reader 102 and utilized to determine the transmission properties for the channel from the tag 106 to the reader 102 for detection of the data 212 of the earlier received packet 110.

FIG. 2b illustrates a second type of overlap in which the preamble 210 of the first data packet 110 received at the reader 102 overlaps in time with the preamble 220 of the second data packet 112 received at the reader 102. In this type of overlap, the second data packet 112 interferes with the preamble 210 of the first data packet 110.

Embodiments of the present disclosure relate to RFID transmission formats that use real-valued signal constellations, including but not limited to, binary phase shift keying (BPSK) and minimum-shift keying (MSK). The baseband equivalent representation of an MSK signal can be expressed as:

$$s(t) = \sum_n j^n b[n] f(t - nT),$$

where $j = \sqrt{-1}$, $b[n]$ are the data symbols (including known preamble symbols) transmitted by the tag 106, 108, T is the symbol interval and $f(t)$ is the pulse shape.

For a transmitted data packet 110, the sampled baseband signal received at the reader 102 can be written as:

$$r[k] = \sum_i b[k-i] h[i] + n[k], \quad (1)$$

where $h[k]$ is the overall discrete-time channel impulse response, and $n[k]$ is additive noise.

If two data packets 110, 112 overlap in time, the sampled baseband signal received at the reader 102 can be written as:

$$r[k] = \sum_i b_1[k-i] h_1[i] + e^{j 2\pi v k T} \sum_i b_2[k-i] h_2[i] + n[k], \quad (2)$$

where $b_1[k]$ and $b_2[k]$ are the data from the first tag 106 and second tag 108 (including known preamble symbols), $h_1[k]$ and $h_2[k]$ represent the overall discrete-time channel from the first data packet 110 and second data packet 112, and v is the frequency offset between first data packet 110 and second data packet 112. Equations 1 and 2 assume a symbol-rate sampling at the reader 102. Alternatively, oversampling may be applied at the reader 102, or multiple RFID antenna elements may be applied at the reader 102.

Figure 3:
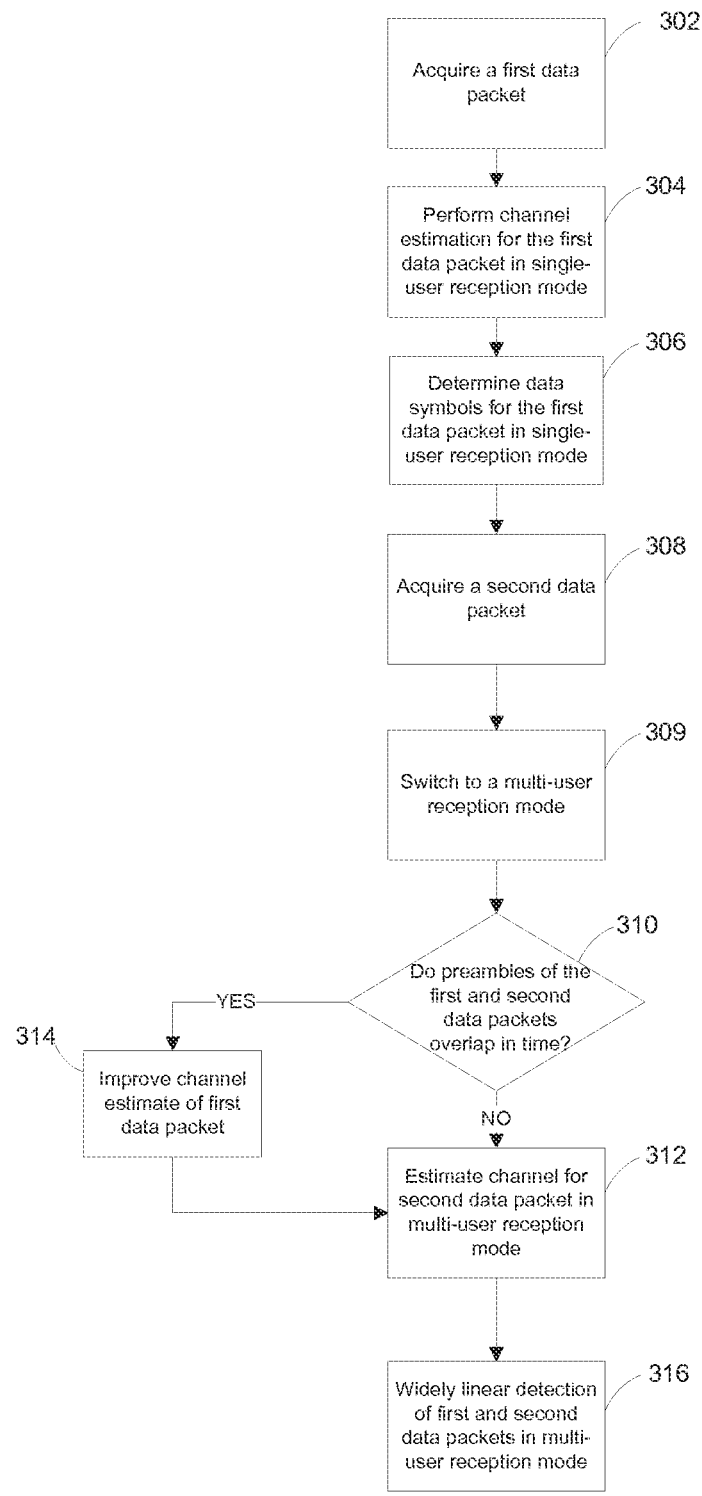
FIG. 3 shows a flow chart illustrating a method of performing multi-user detection of two data packets in an RFID system in accordance with the disclosure.

FIG. 3 is a flowchart illustrating a method for performing multi-packet reception of two overlapping data packets 110, 112 in an RFID system 100. In an embodiment, the method is advantageously performed by the reader 102 performing stored instructions. Instructions may be stored in the memory of the reader 102 or may be stored on a separate memory device in communication with the reader 102.

The method begins by acquiring a first received data packet 110 at 302. Next, channel estimation for the first received data packet 110 is performed in a single-user reception mode at 304. After performing the channel estimate at 304, the data symbols of the first received data packet are determined in a single-user reception mode at 306. A second received data packet 112 is acquired at 308, while the first received packet 110 is being processed in the single-user reception mode.

After the second received data packet 112 has been acquired at 308, the method switches to a multi-user reception mode at 309. A determination of whether the preamble 220 of the second received data packet 112 overlaps the preamble 210 of the first received data packet 110 may optionally be made at 310.

If the preamble 220 of the second data packet 112 is determined at 310 not to overlap the preamble 210 of the first data packet 110, then an estimate of the channel of the second data packet 112 is performed in multi-user reception mode at 312.

If the preamble 220 of the second data packet 112 is determined at 310 to overlap the preamble 210 of the first data packet 110, then the channel estimate of the first received data packet, performed at 304, is improved at 314 prior to estimating the channel of the second received data packet 112 in the multi-user reception mode at 312.

After the channel of the second received data packet 112 is estimated at 312, widely linear (WL) detection of the first received data packet 110 and the second received data packet 112 is performed at 316.

Alternatively, the determination at 310 of whether the preamble 220 of the second received data packet 112 overlaps the preamble 210 of the first received data packet 110 may be omitted. In this case, further processing of the data packets 110 and 112 proceeds on the assumption that the preamble 220 of the second received data packet 112 does not overlap the preamble 210 of the first received data packet 110. In the case in which the determination at 310 is omitted and the preambles 210 and 220 do overlap, resolving the first received data packet 110 and the second received data packer 112 may not be possible and a subsequent transmission of the data packets 110, 112 may be required.

Figure 4:
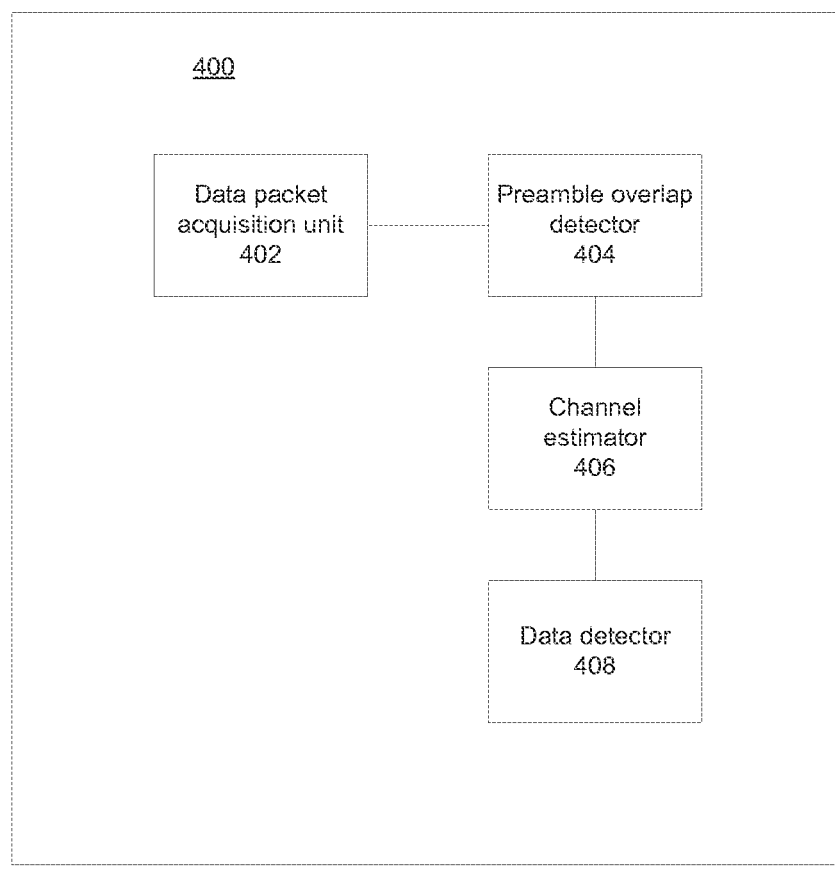
FIG. 4 shows a schematic of a receiver for performing multi-user detection of two data packets in an RFID system in accordance with the disclosure.

Referring to FIG. 4, a schematic of a receiver 400 for performing multi-user detection of two data packets 110, 112 is shown. The receiver includes a data packet acquisition unit 402, a preamble overlap detector 404, a channel estimator 406, and a data symbol detector 408. Although FIG. 4 shows the data packet acquisition unit 402, the preamble overlap detector 404, the channel estimator 406, and the data detector 408 as discrete elements, these elements may be provided by a single hardware element such as, for example, the reader 102.

The data packet acquisition unit 402 is in communication with an RFID antenna (not shown) in order to acquire the RFID data packets 110 and 112. Optionally, a preamble overlap detector 404 may be included in communication with the data acquisition unit 402 in order to determine whether a preamble 210 of a first received data packet 110 overlaps in time with a preamble 220 of a second received data packet 112. The channel estimator 406 performs channel estimation on the first received data packet 110 and the second received data packet 112. The data detector 408 detects the data symbols of the first received data packet 110 and the second received data packet 112. The channel estimator 406 and the data detector 408 are configured to perform channel estimation and data detection in a single-user reception mode on a first received RFID data packet 110 from a first RFID tag 106, and, in response to receiving a second RFID data packet 112 from a second RFID tag 108 while the first RFID data packet 110 is being processed in the single-user reception mode, performing channel estimation and data detection in a multi-user reception mode to recover data transmitted from both the first and second RFID tags 106, 108 in a collision-less manner.

In an embodiment, the channel estimator 406 is a single hardware element configured to operate in both a single-user reception mode and a multi-user reception mode, as described above. In another embodiment, the channel estimator 406 comprises a first channel estimator that operates in a single-user detection mode and a second, separate, channel estimator that operates in a multi-user reception mode. Similarly, the data detector 408 may be a single hardware element configured to operate in both a single-user reception mode and a multi-user reception mode, as described above, or may comprise a first data detector that operates in a single-user detection mode and a second, separate data detector that operates in a multi-user reception mode.

Alternatively, the preamble overlap detector 404 may be omitted from the receiver 400. In this case, further processing of the first received data packet 110 and the second received data packet 112 proceeds on the assumption that the preamble 220 of the second received data packet 112 does not overlap the preamble 210 of the first received data packet 110, as described above.

Figure 5:
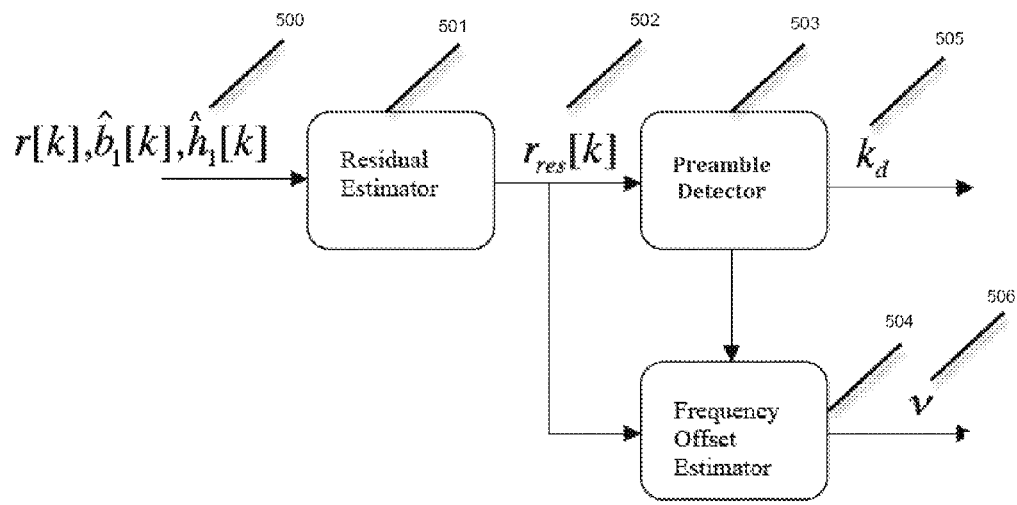
FIG. 5 shows a schematic view of an apparatus configured to perform the acquisition of the second data packet 112 in the method of FIG. 3.

FIG. 5 illustrates the details of the acquisition of the second received data packet 112 (308 in FIG. 3) by the data packet acquisition unit 402. The signals 500 utilized for the acquisition are the down-converted, sampled signal received at the reader 102, r[k], the detected data $\hat{b}_1[k]$, from the first data packet 110, and the channel estimation $\hat{h}_1[k]$, provided by the channel estimator 406 operating in the single-user mode, are processed in a residual estimator 501, which is specified as:

$$r_{res}[k] = r[k] - \sum_{i=0}^{L} \hat{b}_1[k-i]\hat{h}_1[i],$$

where L+1 is the length of the estimated channel $\hat{h}_1[k]$. The residual signal $r_{res}[k]$ 502 determined in the residual estimator 501 is utilized in a preamble detector 503 for acquiring the second data packet 112. Preamble detection may be based on the correlation metric:

$$R[k] = \sum_{i=0}^{K} r_{res}[k+i]b_2[i],$$

where $b_2[k]$ are the known preamble symbols of the second data packet 112. When a second data packet 112 has been acquired, a frequency offset estimator 504 obtains an estimate for the frequency offset v 506 between the reader's and the tag's local oscillators. Frequency offset estimation may be based on the D-lag differential $r_{res}[k]r^*_{res}[k+D]$ and the Fitz estimator. The preamble detector 503 delivers a value $k_d$ 505, which is a relative delay, measured in number of samples, for the start of the second data packet 112 with respect to the start of the first data packet 110.

Figure 6:
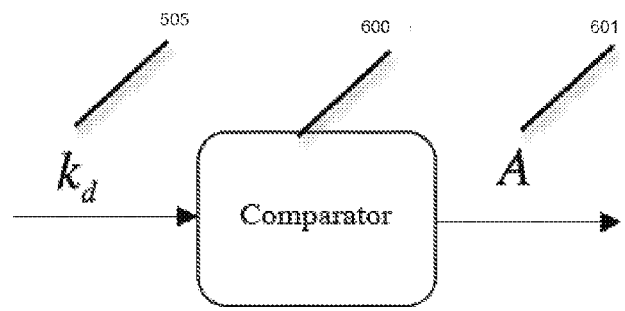
FIG. 6 shows a schematic view of an apparatus configured to perform the detection of an overlap in the preambles of two data packets in the method of FIG. 3.

FIG. 6 illustrates the details of how an overlap in the preambles 210, 220 is detected (310 in FIG. 3) at the preamble overlap detector 404. The relative packet delay $k_d$ 505 from the preamble detector 503 is applied in a comparator 600 that may produce the Boolean output A 601 according to:

$$A = \begin{cases} \text{Yes}, & k_d < K+1 \\ \text{No}, & k_d \geq K+1 \end{cases},$$

where K+1 is the length of the preamble of data packet 110 in number of samples, which is a system parameter and identical for all data packets and thus known at the reader.

Figure 7:
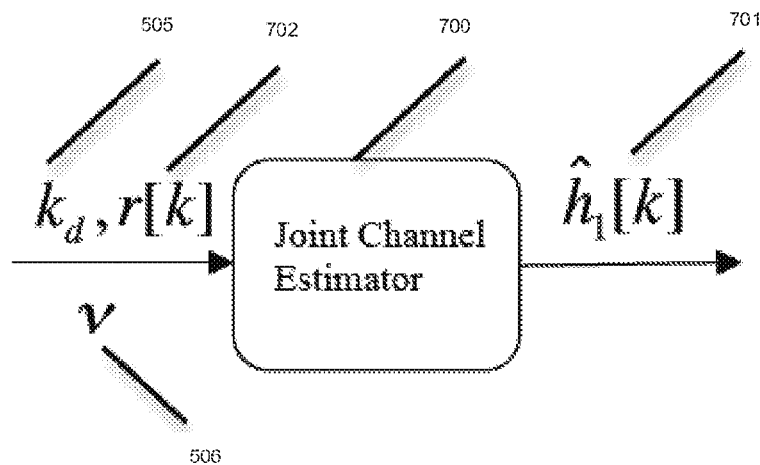
FIG. 7 shows a schematic view of an apparatus configured to perform the improvement of the channel estimation determined in the case where the preambles overlap in the method of FIG. 3.

FIG. 7 illustrates the details of how the channel estimator 406 improves the channel estimation (at 314 in FIG. 3) of the first received RFID data packet 110 (determined at 304 in FIG. 3) in the case where the preambles 210 and 220 overlap (i.e. when A=Yes in FIG. 6). The relative packet delay $k_d$ from the preamble detector 503 is used by a joint channel estimator 700. This estimator may use a signal model:

$$r = [B_1 \quad C_v B_2]\begin{bmatrix} h_1 \\ h_2 \end{bmatrix} + n,$$

where r is the vector of the K−L+1 samples r[k] 702, as in equations 1 and 2, which are received at the reader 102 during the reception of the preamble 210 of the first data packet 110, $h_1$ and $h_2$ are the channel vectors of length L+1 for the first data packet 110 and the second data packet 112 respectively, and n is the noise vector. The matrix $C_v$ follows from the frequency-offset estimate v 506 as:

$$C_v = \begin{bmatrix} 1 & 0 & \cdots & 0 \\ 0 & e^{j2\pi vT} & \ddots & 0 \\ \vdots & \ddots & \ddots & \vdots \\ 0 & 0 & \cdots & e^{j2\pi vTK} \end{bmatrix}$$

and the matrix $B_1$ is given by:

$$B_1 = \begin{bmatrix} b_1[K] & b_1[K-1] & \cdots & b_1[K-L] \\ \vdots & & \ddots & \vdots \\ b_1[L+1] & b_1[L] & \ddots & b_1[1] \\ b_1[L] & b_1[L-1] & \cdots & b_1[0] \end{bmatrix}$$

and $B_2$ is of the same structure as $B_1$ but with the elements $b_2[k]$ being set to zero for $k<k_d$. $b_1[k]$ and $b_2[k]$ are the preamble symbols for the first data packet 110 and the second data packet 112, respectively. The joint channel estimator 700 may estimate the vectors $h_1$ and $h_2$ by utilizing a least-squares estimation. The estimate of the first channel $\hat{h}_1$ 701 is used for the rest of the detection process.

Figure 8:
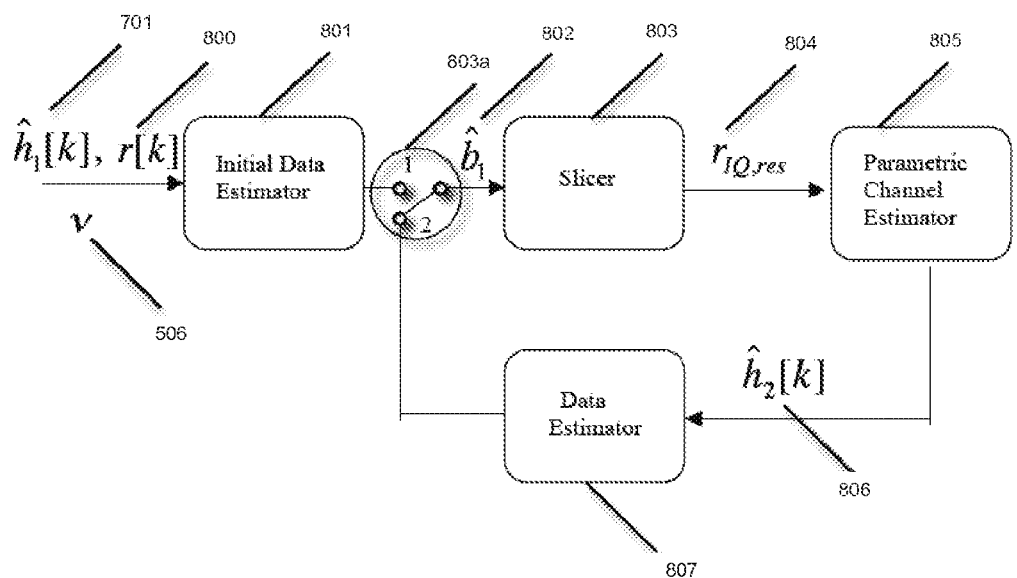
FIG. 8 shows a schematic view of an apparatus configured to perform the channel estimation for a second packet in the method of FIG. 3.

FIG. 8 illustrates an example for performing the channel estimation 312 for the second packet 112. The vector r of the K−L+1 samples r[k] 800 as in equation 2, which is received at the reader 102 during the reception of the preamble 220 of the second packet 112 may be represented as:

$$r = [H_1 \quad B_2]\begin{bmatrix} b_1 \\ h_2 \end{bmatrix} + n,$$

where $b_1$ is the vector of K−L+1 data symbols of the first data packet 110, $h_2$ is the channel vector of length L+1 for the second data packet 112, n is the noise vector, the matrix:

$$B_2 = \begin{bmatrix} 1 & 0 & \cdots & 0 \\ 0 & e^{j2\pi v} & \ddots & 0 \\ \vdots & \ddots & \ddots & \vdots \\ 0 & 0 & \cdots & e^{j2\pi vK} \end{bmatrix}\begin{bmatrix} b_2[K] & b_2[K-1] & \cdots & b_2[K-L] \\ \vdots & & \ddots & \vdots \\ b_2[L+1] & b_2[L] & \ddots & b_2[1] \\ b_2[L] & b_2[L-1] & \cdots & b_2[0] \end{bmatrix}$$

includes K+1 known preamble symbols from the second packet and the estimated frequency offset v 506, and the matrix:

$$H_1 = \begin{bmatrix} \hat{h}_1[0] & \cdots & \hat{h}_1[L] & 0 & \cdots & 0 \\ 0 & \hat{h}_1[0] & \cdots & \hat{h}_1[L] & \cdots & 0 \\ \vdots & \ddots & \ddots & \ddots & \ddots & 0 \\ 0 & \cdots & 0 & \hat{h}_1[0] & \cdots & \hat{h}_1[L] \end{bmatrix}$$

is constructed from the estimated channel coefficients $\hat{h}_1$ 701. The above model may be turned into an equivalent model:

$$r_{IQ} = [H_{1,IQ} \quad B_{2,IQ}]\begin{bmatrix} b_1 \\ h_{2,IQ} \end{bmatrix} + n_{IQ},$$

where $r_{IQ}, h_{2,IQ}, n_{IQ}, H_{1,IQ}$ are constructed by expanding each complex element in the vectors r, $h_2$, n and the matrix $H_1$ into a stacked vector of the real and imaginary components. The matrix $B_{2,IQ}$ constructed from the matrix $B_2$ by taking each complex entry x and expanding it to $$\begin{bmatrix} \text{Re}(x) & -\text{Im}(x) \\ \text{Im}(x) & \text{Re}(x) \end{bmatrix}.$$

This model allows for widely linear (WL) estimation. Based on this model, an initial data estimator 801 generates an initial estimate $\hat{b}_1$ 802 of $b_1$ using, for example, a least-squares estimation:

$$\begin{bmatrix} \hat{b}_1 \\ \hat{h}_{2,IQ} \end{bmatrix} = [H_{1,IQ} \quad B_{2,IQ}]^{-1} r_{IQ},$$

where $^{-1}$ denotes pseudo-inverse of a matrix. The slicer 803, with the switch 803a in position 1, quantizes the elements of $\hat{b}_1$ to the nearest symbol of the signal constellation giving the vector $b_{1,sliced}$, and generates the vector $r_{IQ,res}$ 804 of residual observations:

$$r_{IQ,res} = r_{IQ} - H_{1,IQ} b_{1,sliced}.$$

Using the residual observation, improved channel estimation can be achieved. For example, a classical least-squares estimation can be applied. The example illustrated in FIG. 8 uses a parametric estimator 805 that utilizes channel coefficients that are determined through the pulse shape of the RFID signal. This leads to a least-squares estimation problem with constrained phase and the improved channel estimate $\hat{h}_2[k]$ 806. This estimate is used for an improved data symbol estimate 802 $\hat{b}_1 = H_1^{-1}(r - B_2\hat{h}_2)$ generated in the data estimator 807, which is returned to the slicer 803 (switch 803a is in position 2). This iterative process is repeated until a stopping condition is reached, such as, for example, that no changes in the data estimate $\hat{b}_1$ occur between iterations.

Figure 9:
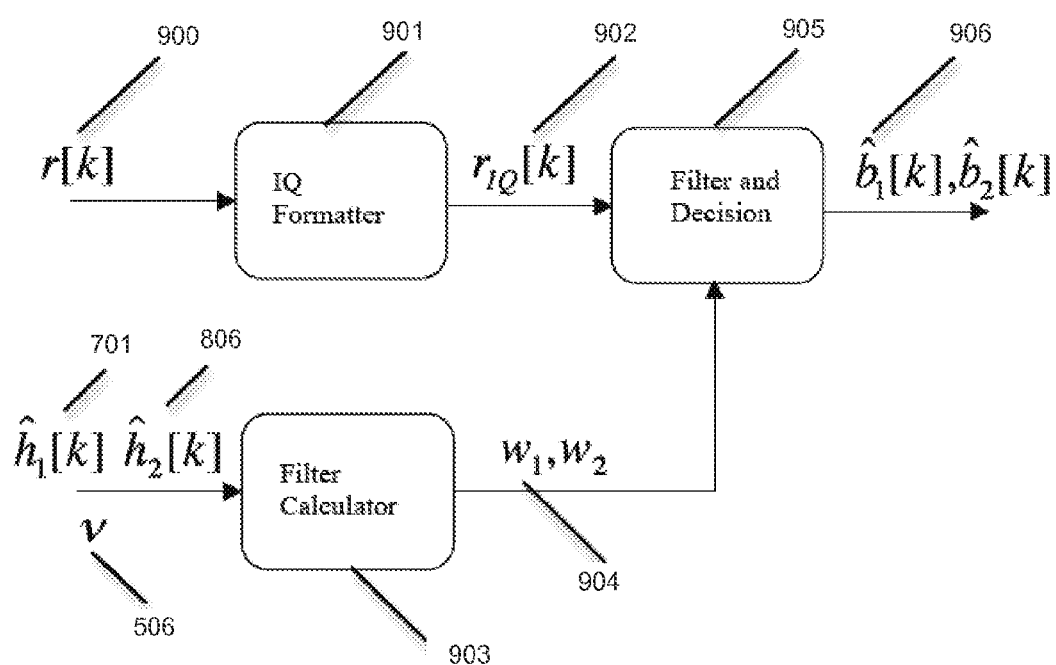
FIG. 9 shows a schematic of an apparatus configured to perform a widely linear multi-user detection of two data packets during a period of overlap.

FIG. 9 illustrates the details of how the data detector 408 performs the WL multi-user detection (at 316 in FIG. 3), for the data symbols of the first and second data packets 110, 112 that overlap in time. During the overlap of the data symbols, the sampled received signal r[k] 900 as in equation 2 can be written as:

$$r[k] = \sum_{i=0}^{L} [h_1[i] \quad e^{j2\pi vkT} h_2[i]]\begin{bmatrix} b_1[k-i] \\ b_2[k-i] \end{bmatrix} + n[k].$$

The IQ-formatter 901 shown in FIG. 9 organizes the received samples into $r_{IQ}[k] = [\text{Re}(r[k]) \quad \text{Im}(r[k])]^T$ 902, in which the signal model becomes:

$$r_{IQ}[k] = \sum_{i=0}^{L} H_{IQ,k}[i]b[k-1] + n_{IQ}[k],$$

where $n_{IQ}[k]=[\text{Re}(n[k]) \text{ Im}(n[k])]^T$, $b[k]=[b_1[k] \ b_2[k]]^T$, and:

$$H_{IQ,k}[i] = \begin{bmatrix} \text{Re}(h_1[i]) & \text{Re}(e^{j2\pi vkT}h_2[i]) \\ \text{Im}(h_1[i]) & \text{Im}(e^{j2\pi vkT}h_2[i]) \end{bmatrix}.$$

The filter calculator 903 determines the filter coefficients for processing $r_{IQ}[k]$ 902. In an embodiment, a filter and decision device 905 uses linear filtering according to the minimum mean-square error (MMSE) criterion. In this case, the filter calculator determines the coefficients $w_p = [w[0], \ldots, w[2N-1]]^T$ 904 for data from tags p=1,2 according to:

$$w_p = (H_{IQ,k}H_{IQ,k}^T + \Sigma)^{-1} h_{IQ,k_p},$$

where $h_{IQ,k_p}$ is the $(2k_p+p)$th column of $H_{IQ,k}$, $\Sigma$ is the noise covariance matrix, which is determined by the RFID signaling format, $k_p$ is the chosen decision delay, $$H_{IQ,k} = \begin{bmatrix} \hat{H}_{IQ,k}[0] & \ldots & \hat{H}_{IQ,k}[L] & 0 & \ldots & 0 \\ 0 & \hat{H}_{IQ,k-1}[0] & \ldots & \hat{H}_{IQ,k-1}[L] & \ldots & 0 \\ \vdots & \ddots & \ddots & \ddots & \ddots & 0 \\ 0 & \ldots & 0 & \hat{H}_{IQ,k-N+1}[0] & \ldots & \hat{H}_{IQ,k-N+1}[L] \end{bmatrix}$$

and $$\hat{H}_{IQ,k}[i] = \begin{bmatrix} \text{Re}(\hat{h}_1[i]) & \text{Re}(e^{j2\pi vkT}\hat{h}_2[i]) \\ \text{Im}(\hat{h}_1[i]) & \text{Im}(e^{j2\pi vkT}\hat{h}_2[i]) \end{bmatrix}$$

uses the estimated channels $\hat{h}_1[k]$ 701 and $\hat{h}_2[k]$ 806 and frequency offset v 506. The parameter N trades off performance and computational complexity. In the embodiment using a linear MMSE filter, filter and decision unit 905 performs the filter operation $$\hat{b}_p[k] = \text{sign}(w_p^T r_{IQ}), p=1,2,$$

where $r_{IQ} = [r_{IQ}^T[k]e_{IQ}^T[k-1], \ldots, r_{IQ}^T[k-N+1]]^T$ and sign( ) is a function that returns the sign of the real variable within the brackets and outputs the data estimates $\hat{b}_1[k], \hat{b}_2[k]$ 906.

Alternatively, the filter calculator 903 and the filter and decision unit 905 use decision-feedback (also known as successive interference cancellation) or maximum-likelihood detection. Alternatively, the filter calculator 903 uses an adaptive algorithm such as for example the Least Mean Squares (LMS) algorithm to compute the filter coefficients. Alternatively, the filter calculator 903 uses a recursive method to compute the filter coefficients.

Figure 10:
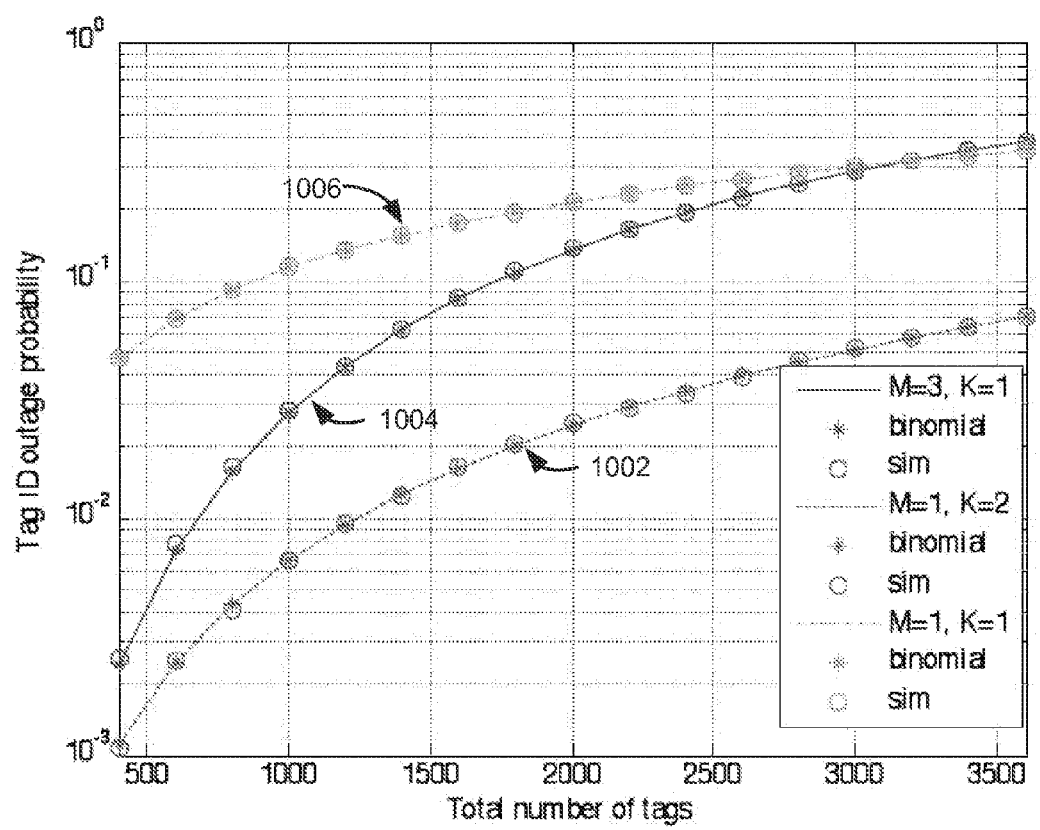
FIG. 10 shows a graph of simulated data of the Tag ID outage probability vs. total number of tags.

FIG. 10 shows the outage rate for an idealized scenario where all collisions of packets from two tags can be resolved, which is an upper bound for the performance achievable with the disclosed invention, as well as the outage rate for a conventional receiver and for an RFID protocol suggested during standardization in the TG IEEE 802.15.4f, where an outage means that packets cannot be detected, versus the number of tags in an RFID system. FIG. 10 illustrates the potential performance gain assuming we can detect data from two colliding tags, as enabled by the disclosed invention. The system setup assumes that tags transmit their ID packet of length 600 micro-seconds uniformly randomly in an interval of 10 seconds. The curve 1002 corresponds to data detection in the case of collisions of packets from two tags and is labeled with M=1, K=2. Curve 1004 shows results for conventional detection (state of the art) and is labeled with M=1, K=1. Curve 1006 shows results for another transmission format that was proposed during standardization in the TG IEEE 802.15.4f, the so-called Double-P-Aloha, in which each tag transmits its packets three times (labeled with M=3, K=1). The lines and star markers for each of the curves 1002, 1004, and 1006 are analytical approximations of the outage probabilities, and the circle markers are simulated results. The improvement that can be achieved by jointly detecting colliding packets is apparent, and this improvement means that tag density can be increased while keeping the same reliability of registration, or the time it takes to register all tags can be reduced.

FIG. 11 shows simulated packet error rates (PERs) for an embodiment of the invention as described in which two tags send their packets randomly and suffer from different collision rates, as indicated in the third column from the left. The packets from the two tags are received at the reader with different powers, which is reflected in the signal-to-interference power ratio (SIR) shown in the second column from the left. The fourth to sixth columns from the left show the PERs for the packets from the two tags, individually and averaged, when using conventional detection at the reader. The seventh to ninth columns show the corresponding results when WL multi-user detection is used as disclosed above. The results confirm that the disclosed WL multi-user detection achieves significant improvements in PER compared to conventional detectors. In the simulated detector (applying linear MMSE filtering for WL multi-user detection), not all packet collisions could be resolved. Using successive interference cancellation would achieve further improvements.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

The invention claimed is:

1. A method of processing RFID data packets at an RFID receiver, comprising:
    performing channel estimation and data detection on a first received RFID data packet in a single-user reception mode, the first RFID data packet being transmitted by a first RFID tag;

acquiring a second received RFID data packet from a second RFID tag while the first RFID data packet is being processed in the single-user reception mode; and in response to acquiring the second received RFID data packet, performing channel estimation and data detection in a multi-user reception mode to recover data transmitted from both the first and second RFID tags in a collision-less manner;

wherein acquiring the second received RFID data packet comprises using a residual received signal.

2. The method according to claim 1, further comprising:
determining that a preamble of the second received RFID data packet overlaps in time a preamble of the first RFID data packet; and in response to the determining, improving the channel estimation of the first received RFID data packet determined in the single-user reception mode, prior to performing the channel estimation and the data detection in the multi-user reception mode.

3. The method according to claim 2, wherein improving the channel estimation comprises applying a least-square estimation filter to the first and second received RFID data packets in response to determining that the preamble of the second received RFID data packet overlaps in time with the preamble of the first RFID data packet.

4. The method according to claim 1, further comprising, in the multi-user reception mode, performing a frequency offset estimation for the second received RFID data packet.

5. The method according to claim 1, wherein performing data detection in the multi-user reception mode comprises utilizing widely linear detection in a mode of one of linear multi-user detection, decision-feedback multi-user detection, and maximum-likelihood multi-user detection.

6. The method according to claim 1, wherein the first received data packet and the second received data packet are acquired by applying oversampling or by utilizing multiple RFID antennae.

7. The method according to claim 1, wherein performing data detection in the multi-user reception mode comprises utilizing filters optimized according to criterion from one of zero-forcing and minimum mean-square error.

8. The method according to claim 1, wherein performing data detection in the multi-user reception mode comprises utilizing filters that are adaptively optimized using a recursive algorithm.

9. The method according to claim 1, wherein performing channel estimation in the multi-user reception mode comprises determining an estimate of the interfering data symbols of the first received data packet.

10. An RFID receiver for processing RFID data packets, comprising:
a data packet acquisition unit for receiving RFID data packets transmitted by RFID tags;
a channel estimator; and
a data detector;

wherein the channel estimator and the data detector perform channel estimation and data detection on a first received RFID data packet in a single-user reception mode, the first RFID data packet being transmitted by a first RFID tag; and wherein the data packet acquisition unit is configured to acquire a second received RFID data packet while the first RFID data packet is being processed in the single-user reception mode, the second RFID data packet being transmitted by a second RFID tag, and, in response to acquiring a second received RFID data packet, the channel estimator and the data detector perform channel estimation and data detection in a multi-user reception mode to recover data transmitted from both the first and second RFID tags in a collision-less manner;

wherein, in the multi-user reception mode, acquiring the second received RFID data packet comprises using a residual received signal.

11. The RFID receiver according to claim 10 further comprising a preamble overlap detector that determines whether a preamble of the second received RFID data packet overlaps in time with a preamble of the first RFID data packet.

12. The RFID receiver according to claim 11, wherein, in the multi-user reception mode, the channel estimator applies a least-square estimation filter to the first and second received RFID data packets in response to the preamble overlap detector determining that the preamble of the second received RFID data packet overlaps in time with the preamble of the first RFID data packet.

13. The RFID receiver according to claim 10, wherein, in the multi-user reception mode, the data detector utilizes widely linear detection in a mode of one of linear multi-user detection, decision-feedback multi-user detection, and maximum-likelihood multi-user detection.

14. The RFID receiver according to claim 10, wherein, in the multi-user reception mode, the data detector utilizes filters optimized according to criterion from one of zero-forcing and minimum mean-square error.

15. The RFID receiver according to claim 10, wherein, in the multi-user reception mode, the data detector utilizes filters that are adaptively optimized using a recursive algorithm.

16. The RFID receiver according to claim 15, wherein the recursive algorithm is one of a least mean squares algorithm and a recursive least squares algorithm.

17. The RFID receiver according to claim 10, wherein, in the multi-user reception mode, the channel estimator determines an estimate of the interfering data symbols of the first received data packet.

18. The RFID receiver according to claim 10, wherein, in the multi-user reception mode, the data packet acquisition unit performs a frequency offset estimation for the second received RFID data packet.

* * * * *